United States Patent [19]

Fillion

[11] Patent Number: 5,224,411
[45] Date of Patent: Jul. 6, 1993

[54] HYDRAULIC CIRCUIT FOR SUPPLYING AT LEAST ONE HYDRAULIC MOTOR INCORPORATING "DISENGAGEABLE" PISTONS

[75] Inventor: Pierre Fillion, Pontpoint, France

[73] Assignee: Poclain Hydraulics, France

[21] Appl. No.: 895,673

[22] Filed: Jun. 9, 1992

[30] Foreign Application Priority Data

Jun. 10, 1991 [FR] France ................. 91 07042

[51] Int. Cl.[5] ............... F15B 11/00; F15B 13/00; F16D 31/02
[52] U.S. Cl. ............................. 91/525; 91/532; 91/491; 60/484
[58] Field of Search ............... 60/420, 427, 468, 484; 91/519, 525, 532, 533, 534, 535

[56] References Cited

U.S. PATENT DOCUMENTS

| B 535,386 | 1/1976 | Eftefield | 60/468 X |
|---|---|---|---|
| B 584,520 | 1/1976 | Rice | 60/468 X |
| 2,616,259 | 11/1952 | Quintilian | 60/427 X |
| 3,768,263 | 10/1973 | Olson et al. | 60/427 X |
| 3,864,910 | 2/1975 | Mechin | 60/420 |
| 4,140,196 | 2/1979 | Brewer | 60/484 X |
| 4,218,883 | 8/1980 | Pedersen | 60/427 |
| 4,244,184 | 1/1981 | Baldauf et al. | 60/420 |
| 4,773,219 | 9/1988 | Bagwell | 60/484 |

FOREIGN PATENT DOCUMENTS

| 0179698 | 10/1985 | European Pat. Off. |
| 3610774 | 4/1987 | Fed. Rep. of Germany . |
| 3744215 | 7/1989 | Fed. Rep. of Germany . |
| 1299123 | 12/1972 | United Kingdom . |
| 1314995 | 4/1973 | United Kingdom . |
| 1437353 | 5/1976 | United Kingdom . |

Primary Examiner—Edward K. Look
Assistant Examiner—John Ryznic
Attorney, Agent, or Firm—Michael, Best & Friedrich

[57] ABSTRACT

The invention relates to a hydraulic circuit for supplying at least one motor incorporating "disengageable" pistons, comprising a fluid distributor valve obturating, in one of its positions, the supply and exhaust conduits of said motor.

According to the invention, the fluid distributor valve comprises a shuttle valve presenting two inlet connections and one outlet connection, and, in said position, establishes communications of the supply conduit with one of the inlet connections, of the exhaust conduit with the other inlet connection, and of a conduit evacuating fluid towards a reservoir with said outlet connection of the shuttle valve.

One application of the invention is the production of a vehicle translation circuit comprising a "disengageable" assistant motor.

2 Claims, 3 Drawing Sheets

HYDRAULIC CIRCUIT FOR SUPPLYING AT LEAST ONE HYDRAULIC MOTOR INCORPORATING "DISENGAGEABLE" PISTONS

FIELD OF THE INVENTION

The present invention relates to a hydraulic circuit for supplying at least one hydraulic motor incorporating "disengageable" pistons.

BACKGROUND OF THE INVENTION

In a hydraulic circuit comprising one or more hydraulic motors, of which at least one is of the "disengageable" type, it is desirable, during certain periods of operation, to be able to "disengage" said disengageable motor.

"Disengageable" motor is understood here to mean a piston engine which is provided with a reaction cam on which said pistons normally abut, but of which the pistons may be placed out of abutment on said cam, as desired by the user.

According to a known application, when the user wishes to place one of the motors in "disengaging" configuration, he isolates this motor from the supply of pressurized fluid and the various pistons, one after the other, repelled by the cam, expel the fluid contained in cylinders in which these pistons slide, out of said cylinders. However, the following poor functioning is observed: the fluid delivered from a cylinder tends to be sucked into an adjacent cylinder. This results in an incomplete return of the pistons in their respective cylinders and in numerous violent shocks which destroy the pistons which did not return completely on the cam. This results in damage which can be avoided by the solution proposed by the invention.

SUMMARY OF THE INVENTION

The invention therefore relates to a hydraulic circuit for supplying at least one hydraulic motor comprising: a source of fluid under pressure; said motor which comprises a reaction cam, "disengageable" radial pistons capable of being placed out of abutment on said reaction cam, and fluid admission and exhaust connections; a fluid distributor valve with at least two positions; a principal supply conduit joining said source of pressurized fluid to said fluid distributor valve; a principal exhaust conduit joined to said fluid distributor valve; a complementary supply conduit joining said admission connection of the hydraulic motor to said fluid distributor valve; a complementary exhaust conduit joining said exhaust connection of the hydraulic motor to said fluid distributor valve; a pressure-less enclosure; and a fluid evacuation conduit joining said fluid distributor valve to said pressure-less enclosure; said fluid distributor valve, in a first position, establishes communications between the principal supply conduit and the complementary supply conduit and, between the complementary exhaust conduit and the principal exhaust conduit, and, in its second position, isolates said principal supply and exhaust conduits from said complementary supply and exhaust conduits.

According to the invention, the fluid distributor valve comprises a shuttle valve presenting two inlet connections and one outlet connection, and, in its second position, additionally establishes communications of the complementary supply conduit with one of the inlet connections of said shuttle valve, of the complementary exhaust conduit with the other inlet connection of the shuttle valve, and of said fluid evacuation conduit with said outlet connection of the shuttle valve.

The following advantageous arrangement is also preferably adopted: the shuttle valve comprises a recess containing a mobile member for selecting the communication of one of said inlet connections with said outlet connection of the shuttle valve, whilst this mobile member of the shuttle valve is constituted by a slide element sliding inside said recess.

The principal advantage of the invention is the obtaining of a definitive return of each piston inside the corresponding cylinder and the clear placing out of abutment of the various pistons with respect to the cam during a "disengagement".

BRIEF DESCRIPTION OF THE DRAWINGS

The invention will be more readily understood on reading the following description with reference to the accompanying drawings, in which.

DETAILED DESCRIPTION OF THE DRAWINGS

Figure 1:
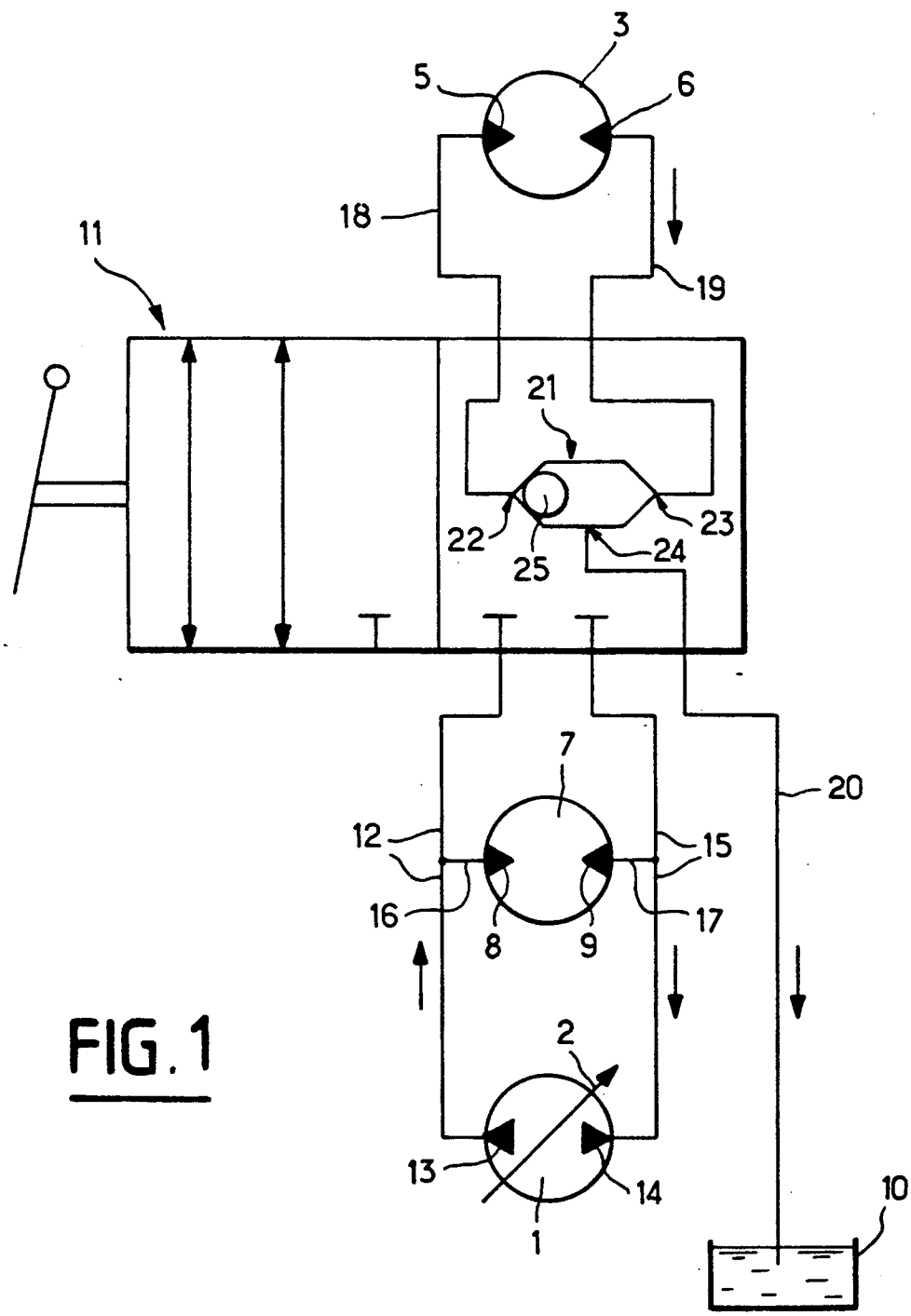
FIG. 1 schematically shows a hydraulic circuit according to the invention.

Referring now to the drawings, FIG. 1 shows the circuit for controlling and supplying two hydraulic motors, comprising:

a variable-capacity pump 1, with inclinable plate 2 for reaction of pistons mounted to slide in cylinders parallel to an axis of rotation, this pump being provided with two principal connections 13 and 14;

a first, reversible, motor 3 with so-called "disengageable" pistons 4 provided with two principal connections 5 and 6;

a second, likewise reversible, motor 7, provided with two principal connections 8 and 9;

a fluid reservoir 10;

a fluid distributor valve 11 with at least two positions; and the following conduits:

a principle supply conduit 12, constituting in the configuration shown, the delivery conduit of the pump 1, connects the principal connection 13 to the fluid distributor valve 11;

a principle exhaust conduit 15 connects the fluid distributor valve 11 to the principal connection 14;

conduits 16 and 17 connect the principal connections 8 and 9 of the second motor 7 to conduits 12 and 15, respectively;

complimentary supply and exhaust conduits 18, 19, respectively connect the principal connections 5, 6 of the first motor 3 to the fluid distributor valve 11, respectively;

a fluid evacuation conduit 20 connects the fluid distributor valve 11 to the reservoir 10.

In addition, the fluid distributor valve 11 comprises a shuttle valve 21 presenting two inlet connections 22, 23, an outlet connection 24 and a mobile element 25 whose conventional function is to obturate one of the inlet connections when it establishes, furthermore, communication between the other inlet connection and the outlet connection 24. The two positions of the fluid distributor valve 11 correspond as follows:

the first position, to the communications of conduits 12 and 18 and of conduits 19 and 15, and to the obturation of conduit 20; and the second position, to the communications of conduit 18 with the inlet connection 22 of the shuttle valve 21, of conduit 19 with the inlet connection 23 of the shuttle valve 21, of the outlet connection 24 of the shuttle valve 21 with the conduit 20, and to the obturations of conduits 12 and 15.

Figure 2:
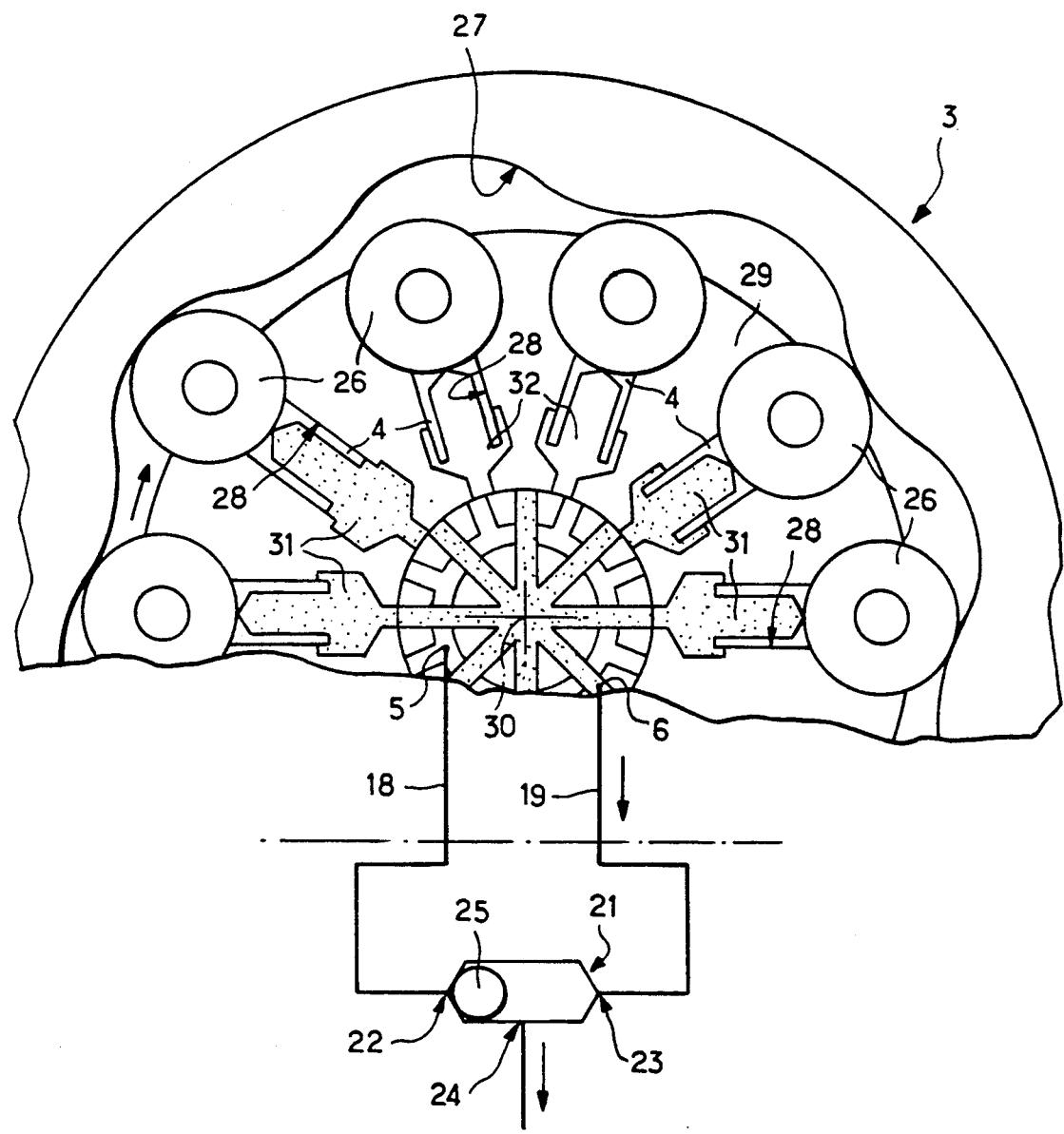
FIG. 2 is a transverse section of the motor "disengageable" from the circuit of FIG. 1, completed by part of this circuit.

Referring to FIG. 2, the transverse section of the motor 3 shows six pistons 4, each coupled to a roller 26 intended, when the motor performs its function of drive, to abut on the lobed cam 27. These pistons 4 are mounted to slide in cylinders 28 made in a cylinder-block 29 mounted to rotate with respect to cam 27 about an axis of rotation 30, and are disposed radially with respect to the axis of rotation 30. Pistons 4 define inside the cylinders 28, working chambers which, taking into account the direction of rotation of the cylinder block 29 with respect to the cam 27, symbolized by arrow F, are distributed in two groups of chambers 31 and 32: the fluid contained in chambers 31 is delivered out of these chambers towards conduit 19 under the effect of the corresponding displacement of the pistons which return inside their cylinders, repelled by first ramps of the cam 27, whilst the other pistons, which are located opposite the other ramps of cam 27, have already returned inside their cylinders, and the chambers 32 that they define are in communication with conduit 18.

Figure 3:
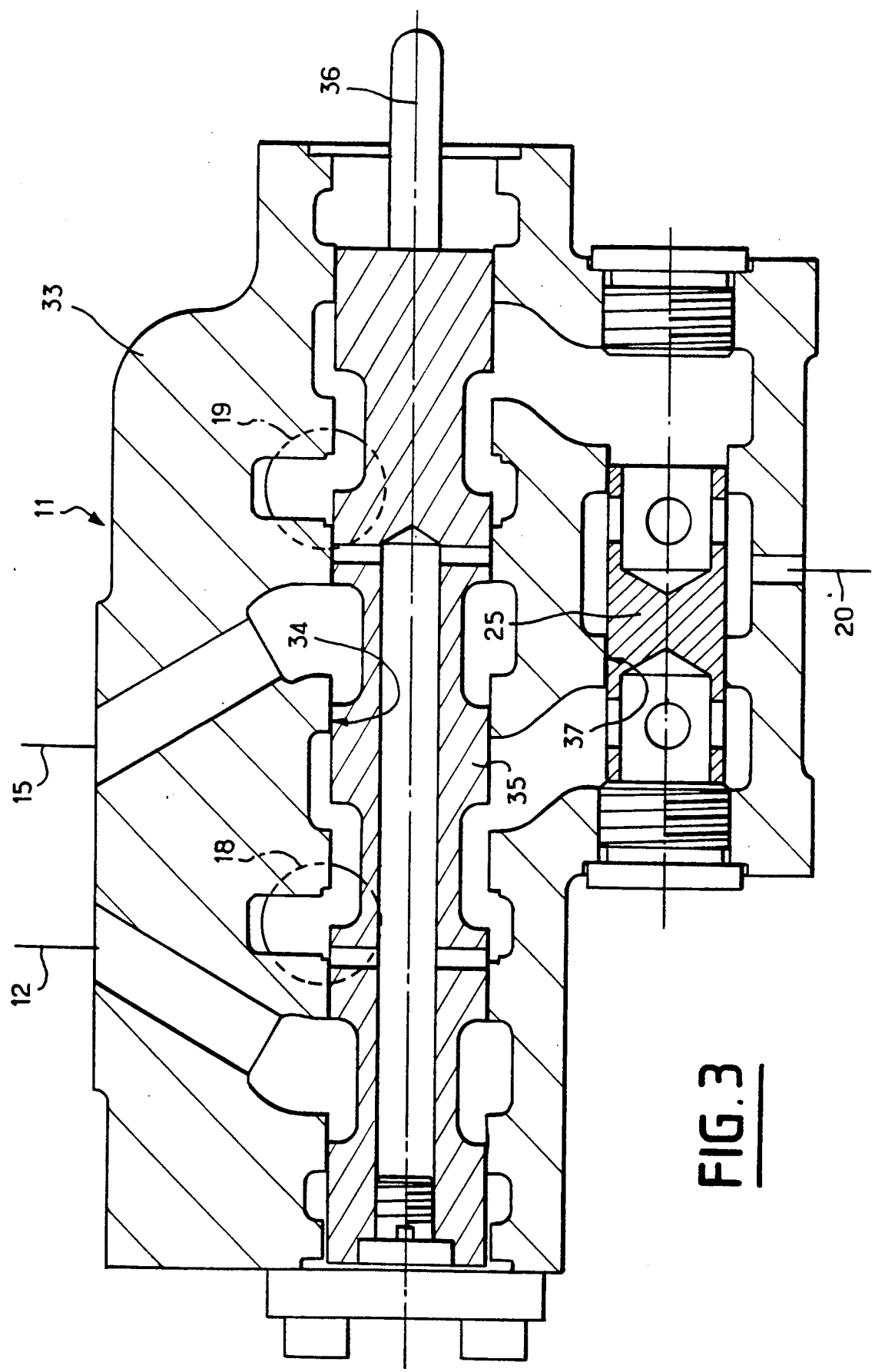
FIG. 3 is an axial section through the fluid distributor valve of the circuit of FIG. 1.

FIG. 3 illustrates an embodiment of the fluid distributor valve 11 and of the shuttle valve incorporated therein.

It may briefly be noted that the fluid distributor valve 11 comprises:

a distributor valve body 33 provided with a first cylindrical bore 34;

a slide element 35 mounted to slide inside bore 34 and provided with a rod 36 for adjusting its position;

a second bore 37 inside which a slide element is mounted to slide and constitutes the mobile element 25 of the shuttle valve.

The functions performed by the slide elements 35 and 25 being conventional, it is unnecessary to describe them, it being observed that conduits 12, 15, 18, 19 and 20 have been indicated and the various grooves of bores 34, 37 and of the slide elements 35, 25 enable the connections described hereinabove between the various conduits to be obtained.

Functioning of the circuit which has just been described will now be set forth.

When the fluid distributor valve 11 is placed in its first position, and when the inclinable plate 2 of the pump 1 presents a first inclination, conduit 12 constitutes the delivery conduit of pump 1 and supplies in parallel motors 7 and 3 via conduits 16 and 18. The fluid which escapes from said motors via conduits 17 and 19 returns to the principal connection 14 of pump 1 via conduit 15. The configuration, in which the delivery conduit of the pump is conduit 15, conduit 12 ensuring the return of the fluid to said pump, corresponds to an inclination of the inclinable plate 2 of pump 1 opposite the preceding one.

When the fluid distributor valve 11 is placed in its second position, motor 7 is supplied without change with respect to the preceding configuration. On the contrary, motor 3 is no longer supplied with pressurized fluid. Its pistons are "disengageable", i.e. this motor comprises a particular device, which is, moreover, known, which makes it possible to obtain return of pistons 4 inside cylinders 28 when conduits 18, 19 are isolated from conduits 12, 15. As has already been indicated, the thrust of cam 27 on rollers 26 and consequently on pistons 4 which define chambers 31, provokes the return of said pistons 4 inside their cylinders 28 and the expulsion of the fluid contained in said chambers 31.

It should be avoided that the fluid leaving a chamber 31 enters in a chamber 32, re-supplying it, as, in that case, the pistons 4 previously returned in their cylinders would emerge again, and the corresponding rollers 26, previously placed out of abutment on cam 27, would interfere again and would come into contact therewith during rotation of the cylinder-block, provoking destructive shocks.

In accordance with the invention, the shuttle valve 21 prevents re-supply of conduit 18 by the fluid contained in conduit 19 and, consequently, re-supply of chambers 32 by the fluid contained in chambers 31. In this way, the detrimental functioning described hereinabove is avoided. Of course, the shuttle valve 21 also prevents re-supply of the chambers 31 by the fluid contained in chambers 32, when the direction of rotation of the cylinder-block is reversed.

The advantage of having made the shuttle valve 21 by adopting the sliding element 25 of FIG. 3, resides in the excellent tightness obtained between said slide element and its bore 37, and consequently in the very satisfactory isolation of chambers 32 with respect to chambers 31,which is obtained.

The invention is not limited to the circuit shown, but covers, on the contrary, all the variants which may be made thereto without departing from its scope nor its spirit. The following observations may be made on this point:

the circuit shown is that for driving a vehicle by means of a motor 7 whose effect may be completed, when this appears necessary, by that of an assistant motor 3, which is, of course, "disengageable", and "disengaged" for most of the time;

however, the invention is also applicable to circuits which comprise only one type of motor: that of the "disengageable" motor 3;

the motors 3 and 7 shown are reversible motors: the invention is also applicable to non-reversible motors which present only one direction of rotation and, in such a case, the shuttle valve may obviously be replaced by a simple non-return valve;

the fact of having chosen a pump 1 with inclinable plate 2 makes it possible, by reversing the inclination of the plate 2, to obtain reversal of the direction of rotation of motors 3 and 7: of course, in the case of adopting a pump not provided with such an inclinable plate, and in the case of a reversible motor 3, a three-way fluid distributor valve 11 should be adopted.

What is claimed is:

1. A hydraulic circuit for supplying at least one hydraulic motor comprising:
    a source of fluid under pressure;
    said motor which comprises a reaction cam, "disengageable" radial pistons capable of being placed out of abutment on said reaction cam, and fluid admission and exhaust connections;
    a fluid distributor valve with at least two positions;
    a principal supply conduit joining said source of pressurized fluid to said fluid distributor valve;

a principal exhaust conduit joined to said fluid distributor valve;

a complementary supply conduit joining said admission connection of the hydraulic motor to said fluid distributor valve;

a complementary exhaust conduit joining said exhaust connection of the hydraulic motor to said fluid distributor valve;

a pressure-less enclosure; and a fluid evacuation conduit joining said fluid distributor valve to said pressure-less enclosure; said fluid distributor valve, in a first position, establishes communications between the principal supply conduit and the complementary supply conduit and, between the complementary exhaust conduit and the principal exhaust conduit, and, in its second position, isolates said principal supply and exhaust conduits from said complementary supply and exhaust conduits;

wherein the fluid distributor valve comprises a shuttle valve presenting two inlet connections and one outlet connection, and, in its second position, additionally establishes communications of the complementary supply conduit with one of the inlet connections of said shuttle valve, of the complementary exhaust conduit with the other inlet connection of the shuttle valve, and of said fluid evacuation conduit with said outlet connection of the shuttle valve.

2. The hydraulic circuit of claim 1, wherein the shuttle valve comprises a recess containing a mobile member for selecting the communication of one of said inlet connections with said outlet connection of the shuttle valve, whilst this mobile member of the shuttle valve is constituted by a slide element sliding inside said recess.

* * * * *